(12) United States Patent
El Essaili et al.

(10) Patent No.: US 12,470,755 B2
(45) Date of Patent: *Nov. 11, 2025

(54) STREAM CONTROLLER

(71) Applicant: Telefonaktiebolaget LM Ericsson (publ), Stockholm (SE)

(72) Inventors: Ali El Essaili, Aachen (DE); Thorsten Lohmar, Aachen (DE); Mohamed Ibrahim, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,902

(22) Filed: May 22, 2024

(65) Prior Publication Data

US 2024/0323456 A1  Sep. 26, 2024

Related U.S. Application Data

(63) Continuation of application No. 17/618,754, filed as application No. PCT/EP2019/065719 on Jun. 14, 2019, now Pat. No. 12,010,354.

(51) Int. Cl.
*H04N 21/218* (2011.01)
*H04N 21/2187* (2011.01)
*H04N 21/25* (2011.01)

(52) U.S. Cl.
CPC ... *H04N 21/21805* (2013.01); *H04N 21/2187* (2013.01); *H04N 21/251* (2013.01)

(58) Field of Classification Search
CPC ......... H04N 21/21805; H04N 21/2187; H04N 21/251; H04N 21/252; H04N 21/4223; H04N 21/43637; H04N 21/6543; H04N 21/6587
See application file for complete search history.

(56) References Cited

U.S. PATENT DOCUMENTS

| | | | |
|---|---|---|---|
| 7,075,567 B2 * | 7/2006 | Hunter | G08B 13/19608 348/E7.086 |
| 8,693,848 B1 | 4/2014 | Pacor et al. | |
| 2003/0025800 A1 | 2/2003 | Hunter et al. | |
| 2007/0100860 A1 * | 5/2007 | Jung | H04N 21/44008 |
| 2009/0085740 A1 * | 4/2009 | Klein | H04N 21/4621 348/143 |
| 2017/0026680 A1 * | 1/2017 | Sugio | H04N 21/2187 |

FOREIGN PATENT DOCUMENTS

| | | |
|---|---|---|
| CN | 105191287 A | 12/2015 |
| CN | 105828206 A | 8/2016 |
| CN | 107 241 611 A | 10/2017 |
| CN | 108886583 A | 11/2018 |
| WO | 2014/145925 A1 | 9/2014 |

OTHER PUBLICATIONS

International Search Report and Written Opinion issued in International Application No. PCT/EP2019/065719 dated Dec. 18, 2019 (9 pages).
3GPP TR 26.925 V0.2.0 (Jan. 2019), 3rd Generation Partnership Project; Technical Specification Group SA WG4 Typical traffic characteristics of media services on 3GPP networks; (Release 16), Jan. 2019 (36 pages).

* cited by examiner

*Primary Examiner* — Alazar Tilahun
(74) *Attorney, Agent, or Firm* — Rothwell, Figg, Ernst & Manbeck, P.C.

(57) ABSTRACT

A method of providing video content to a production studio by selecting an input video stream from a plurality of wireless video cameras.

19 Claims, 6 Drawing Sheets

STREAM CONTROLLER

CROSS-REFERENCE TO RELATED APPLICATIONS

This application is a continuation of U.S. Ser. No. 17/618,754, having a 371(c) date of 2021-12-13 (status pending), which is the 35 U.S.C. § 371 National Stage of International Patent Application No. PCT/EP2019/065719, filed 2019-06-14.

TECHNICAL FIELD

The present disclosure generally relates to the field of video content broadcasting and more specifically to methods and devices for enabling transmission of video content to a production studio from a plurality of wireless video cameras.

BACKGROUND

Live events are one of the major broadcasts on Television, TV, schedules nowadays. TV producers invest a lot of effort to produce Live shows and bring it to consumers in the highest possible production quality. The basic tools used today for producing Live shows and pre-recorded shows are not very different. However; in case of live shows the producer needs to ensure that the various important events happening in the show are delivered to the consumer in a clear sequence.

FIG. 1 depicts how the production process of a live event occurs. In this disclosure, it is assumed that an event producer is interested in covering an outdoor event in a stadium.

The production team distributes their cameras around the stadium and collect the feeds from the different cameras in an on-site studio. The on-site studio could be a room in the stadium or a van with the necessary equipment. Alternately the on-site studio could also be a cloud based. After the media content is processed, it is sent as a single stream to the production studio. There, the stream could be distributed using satellite link or any other available network.

The above system is assuming that all the cameras are connected via wires to an Outside Broadcast Van, OBV, where all cameras are sending high quality video, the high quality video is stored in a storage in the studio, where it is possible to store large amount of data for later viewing, such as for replays.

In todays wired system, all camera feeds are transmitted at high quality so the replay operation can be completely performed in the local production studio. When cameras are connected via a Fifth Generation, 5G, telecommunication system, not all streams are available at high quality at the studio. In order to provide a high quality replay, high quality feeds for replayed content need to be fetched from the other cameras.

However, media producers are moving towards using 5G/New Radio, NR, to connect cameras to the on-site studio. This will simplify and speed-up the process of setting up the component for producing media. The media production doesn't depend on securing wires, it can also reach difficult area, where wiring is not possible and makes movement much easier, which is necessary in dynamic environments.

Therefore, it is desirable to enable a system to allow wireless cameras to transmit High Quality video making efficient use of the available radio resources such as bandwidth.

SUMMARY

It is an object of the present disclosure to provide for a method, and corresponding stream controller, for enabling a wireless camera video to transmit HQ video content but, at the same time, use the available wireless resources efficiently.

In a first aspect of the present disclosure, there is presented a method of providing video content to a production studio by selecting an input video stream from a plurality of wireless video cameras over a wireless telecommunication network, wherein each of said wireless video cameras is arranged for providing at least a High Quality, HQ, and a Low Quality, LQ, video output.

The method comprising the steps of: selecting, by a stream controller, one among said plurality of wireless cameras as a live camera thereby instructing said selected live camera to provide HQ video output such that video content provided to said production studio is said HQ video output from said selected live camera; estimating, by said stream controller, a likelihood of a further one of said plurality of wireless cameras to be a next live camera, following said selected live camera; requesting, by said stream controller, said further one of said plurality of wireless cameras to provide HQ video output based on said estimation such that HQ video output is made available in case said stream controller decides to switch to said further one of said plurality of wireless cameras.

The wireless telecommunication network in accordance with the present disclosure may be any wireless telecommunication network such as a $4^{th}$ Generation or $5^{th}$ Generation wireless telecommunication network. The presented method is especially useful for $5^{th}$ Generation wireless telecommunication networks given the bandwidths involved in wirelessly transmitting video content.

By moving to $5^{th}$ Generation/new radio telecommunication networks, the radio bandwidth may be limited. A producer is limited to the total amount of radio bandwidth that is available. If the system uses many wireless video camera's, then it might not be possible for each of the wireless video cameras to transmit HQ video content at the same time. This would lead to a congestion of the radio bandwidth.

The inventors have found that, typically, only a single wireless camera out of the plurality of wireless cameras is used as a live camera. That is, the feed from a single camera is used for broadcasting. In such a way, at least the live camera should provide for HQ content, while the remaining of the plurality of wireless cameras may suffice in providing LQ content. The LQ content may then be used by the operator to determine whether the live camera should switch to a different camera. If this is the case, then the stream controller could request the different camera to provide HQ content.

The inventors have found an improved method. One of the disadvantages of switching from one camera to the next camera is related to latency. Upon switching to the next camera, the stream controller may request the next camera to provide HQ content. Before the HQ content is received a the production studio, a certain latency will be encountered. The present disclosure is directed to a concept for reducing that particular latency.

This is achieved by predicting, or estimating, by the stream controller which one, or multiple ones, of the plurality of wireless video cameras is/are likely to be considered the next live camera. These cameras are then already requested to provide their content in HQ format. This would ensure that when the stream controller decides to switch to a next camera, the HQ video content of the next camera is already available.

Furthermore, the inventors consider it to be advantageous that the present technique schedules the transmission of the high-quality stream, allows the network to utilize its resources and sends stream without exhausting the radio resource and affecting the main video source.

A live camera may alternately be referred to as the on-air camera. The stream controller may assign one camera as being the live camera. This may be based on an instruction received by the stream controller from a production studio, or for example based on the position of a camera that ensures good coverage of the event being covered. A live camera provides video content in a High Quality, for example High Definition, HD, Full HD, Ultra High Definition, UHD, 4K UHD, 8K UHD etc. The exact resolution with which the camera transmits may be determined by the production studio based on the available radio resources and/or a desired resolution of broadcast.

The other cameras, i.e., replay or off-line cameras are instructed by the stream controller to stream at a lower quality. The skilled person understands that the replay cameras only have to stream at a quality lower than that being streamed by the on-air camera. This ensures an optimal usage of the available radio resources. The present disclosure may thus form an exception on the above provide general rule, wherein one or more off-line cameras may still be requested to provide for HQ video content when it is determined that it is likely that these cameras may be the chosen as the next live camera.

The instruction sent by the stream controller may be in a JavaScript, Open Notation, JSON, format specifying an identifier for a camera and further specifying start and end times of the requested content. Alternately, instead of specifying start and end times, start time and duration may be requested. The instruction may also comprise an indication of the time at which the requested content should go on air.

It is noted that, in accordance with the present disclosure, the stream controller may be distributed over multiple entities. For example, the step of estimating may be performed by a different entity then the step of requesting.

In an example, the step of estimating comprises: determining, by said stream controller, a distance between said further one of said plurality of wireless cameras and said live camera, and estimating, by said stream controller, said likelihood based on said determined distance.

One of the parameters which may be used as an input for determining the likelihood is the distance. The distance between the live camera and the further one camera may be used as an input to determine whether it is likely that the further one camera is the next live camera.

Typically, the likelihood is estimated as being inversely proportional to said determined distance.

This may be understood as follows. The presented method may especially be suitable in, for example, football stadiums, Formula 1 races, ice hockey stadiums or anything alike. In these kind of situations, the plurality of wireless video cameras are distributed over a particular area. This improves the coverage area of the whole system. The angle of view of each of the cameras may still partly overlap. In any case, it may be possible to use a single camera to get a good picture of the location where the action takes place, i.e. where the ball is located or where a particular car races, or anything alike.

The inventors have found that it is likely that a camera that is physically close to the live camera is to be the next live camera. Think of, for example, a particular formula 1 race, wherein a particular car is followed over the track. In such a case, subsequently placed wireless video camera are selected to serve as a live camera to ensure that the car can be tracked over the circuit.

Following the above, the inventors have thus found that the distance between the each of the cameras to the live camera may be used as an input to determine the likelihood.

The distance may be determined in a variety of ways. For example, each of the wireless cameras may be equipped with a GPS sensor for determining its FPS location, and its FPS location may be distributed to the stream controller and/or to any of the wireless video cameras. Another option is that, during the instalment of the video cameras, installation persons manually input the location of each of the wireless video cameras into a registry at the stream controller.

In a further example, the of estimating further comprises: determining, by said stream controller, a rate of change in an angle of view of said live camera and of said further one of said plurality of wireless cameras; estimating, by said stream controller, said likelihood based on said determined rate of change in said angle of view.

Yet another option that could be used for determining whether it is likely that a particular video camera is the next live camera is related to the rate of change in angle of view of the live camera and the particular video camera. When it is likely that the field of view of the particular video camera is going to overlap with the field of view of the live camera, it may be determined that it is likely that that particular video camera is going to be the next live video camera.

More particularly, the likelihood may be estimated proportional to predicted overlap in angle of view of said live camera and of said further one of said plurality of wireless cameras.

In a further example, the step of estimating further comprises: estimating, by said stream controller, a likelihood of each of said plurality of wireless cameras to be a next live camera, following said selected live camera; requesting, by said stream controller, each of said plurality of wireless cameras to provide HQ video output separately based on said estimation such that HQ video output is made available in case said stream controller decides to switch to said further one of said plurality of wireless cameras.

In yet another example, said step of requesting comprises: determining, by said stream controller, that said estimated likelihood exceeds a predetermined threshold value, and wherein said step of requesting comprises: requesting, by said stream controller, any of said plurality of wireless cameras to provide HQ video output for which it is determined that said associated estimated likelihood exceeds said predetermined threshold value.

It may be advantageous to introduce a threshold value for determining whether it is likely that a particular wireless video camera is the next live video camera. This simplifies the implementation of the method into the stream controller.

In a second aspect, there is provided a stream controller for operating in a wireless telecommunication network and arranged for controlling the providing of video content from a plurality of wireless video cameras to a production study over said wireless telecommunication network, wherein each of said wireless video cameras is arranged for providing at least a High Quality, HQ, and a Low Quality, LQ, video output, said stream controller further comprises a processor which is arranged for: selecting one among said plurality of wireless cameras as a live camera thereby instructing said selected live camera to provide HQ video output such that video content provided to said production studio is said HQ video output from said selected live camera; estimating a likelihood of a further one of said plurality of wireless cameras to be a next live camera, following said selected live camera; requesting said further one of said plurality of wireless cameras to provide HQ video output based on said estimation such that HQ video output is made available in case said stream controller decides to switch to said further one of said plurality of wireless cameras.

It is understood that the benefits and advantages of the first aspect of the present disclosure are also associated with the second aspect of the present disclosure, being the stream controller arranged to provide video content to a production studio by selecting an input video stream from a plurality of wireless video cameras. The stream controller may be located in the Radio Access Network, RAN, the 5G core network or on an external application server.

In example, the processor is further arranged for: determining a distance between said further one of said plurality of wireless cameras and said live camera, and estimating said likelihood based on said determined distance.

In a further example, the likelihood is estimated as being inversely proportional to said determined distance.

In another example, the processor is further arranged for said estimating by: determining a rate of change in an angle of view of said live camera and of said further one of said plurality of wireless cameras; estimating said likelihood based on said determined rate of change in said angle of view.

In a further example, the likelihood is estimated proportional to predicted overlap in angle of view of said live camera and of said further one of said plurality of wireless cameras.

In an example, the processor is further arranged for said estimating by estimating a likelihood of each of said plurality of wireless cameras to be a next live camera, following said selected live camera; requesting each of said plurality of wireless cameras to provide HQ video output separately based on said estimation such that HQ video output is made available in case said stream controller decides to switch to said further one of said plurality of wireless cameras.

In a further example, the processor is further arranged for: determining that said estimated likelihood exceeds a predetermined threshold value, and requesting, by said stream controller, any of said plurality of wireless cameras to provide HQ video output for which it is determined that said associated estimated likelihood exceeds said predetermined threshold value.

In a third aspect of the present disclosure, there is provided a computer program product comprising a computer readable medium having instructions stored thereon which, when executed by a stream controller, cause said stream controller to implement a method in accordance with any of the method examples as provided above.

These and other aspects of the invention will be apparent from and elucidated with reference to the embodiment(s) described hereinafter.

DETAILED DESCRIPTION

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of subject matter to those skilled in the art.

Figure 1:
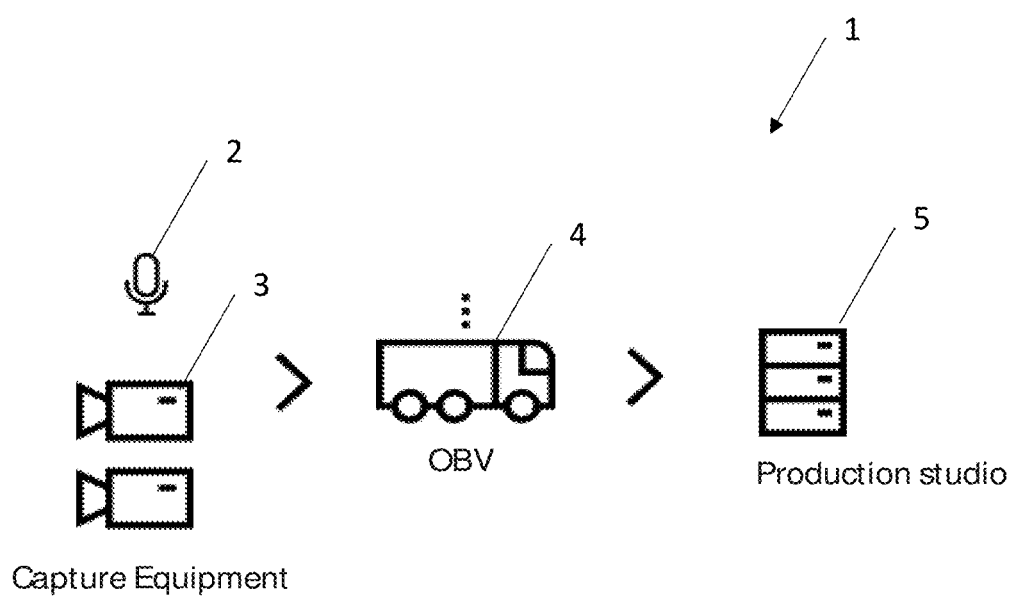
FIG. 1 schematically illustrates an outdoor production system.

FIG. 1 schematically illustrates an outdoor production system, 1. Production system 1 typically comprises a plurality of audio capture equipment 2 and video capture equipments 3. They provide the generated content to an Outside Broadcast Van, OBV 4. An architecture of an OBV 4 is shown in more detail in FIG. 2. Typically the OBV 4 is responsible for receiving multiple audio/video streams from the plurality of audio and video capture equipments 2, 3 and to select one stream from the available plurality of streams, thereby providing a single stream of audio visual content to the production studio 5. The production studio 5 may add further content such as commentary and/or logos before broadcasting.

Figure 2:
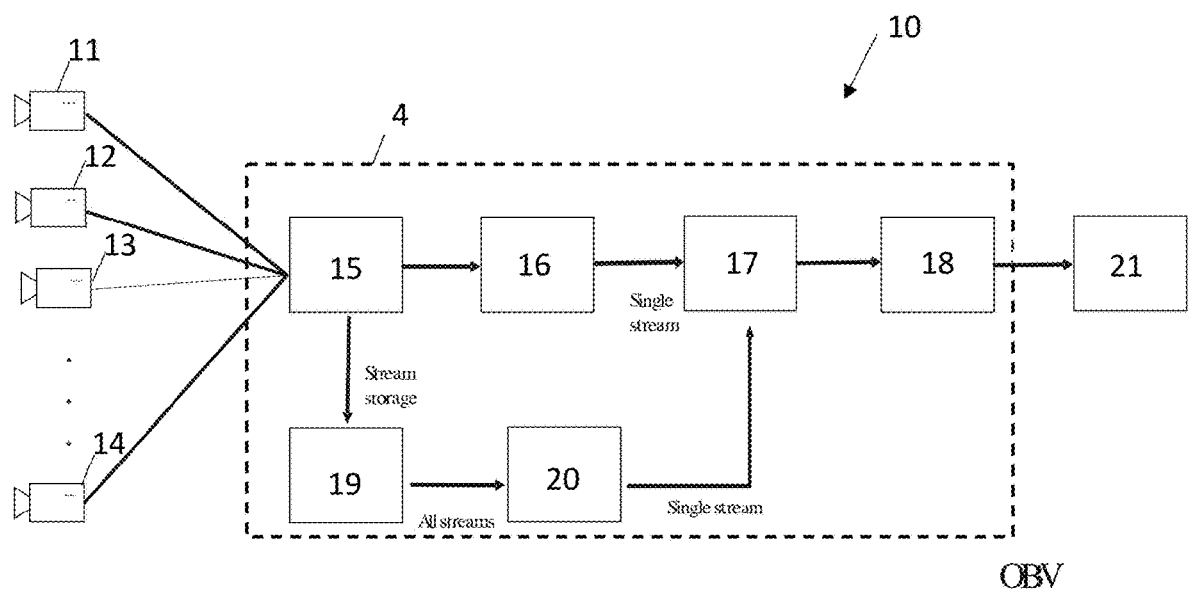
FIG. 2 schematically illustrates an architecture for an outdoor production system according to the prior art.

FIG. 2 schematically illustrates an architecture for an outdoor production system, 10 according to the prior art. The system 10 shown in FIG. 2 assumes a wired setup wherein all the cameras 11-14 are wired and therefore can transmit HQ video content without constraints on radio resources. All cameras 11, 12, 13, 14, output are sent in high quality to the on-site studio, 4. A producer team is viewing all inputs on multiple screens in a multi-viewer 15 and according to the content on the screen they choose which camera should be considered as the main input to the output stream, which goes to the production studio 21. The producer can choose multiple input streams and mix them in one output using the live mixer 16 or the recording mixer 17. The output stream afterwards is sent for further processing 18, adding overlays and then sent for encoding 19. The encoded stream is sent over network to the production studio 21. The studio 21 prepares the final stream for distribution by, for example, adding commentary or channel logos.

The stream from all cameras 11-14, are stored in the storage 19 available at on-site studio 4 in the highest quality. This stream is analyzed by the production team and used for viewing later-on, either after the event or during replays. Where the production team are preparing the replays while the main stream is on air, once the replay is ready, it goes on-air and the live event is put on hold.

Figure 3:
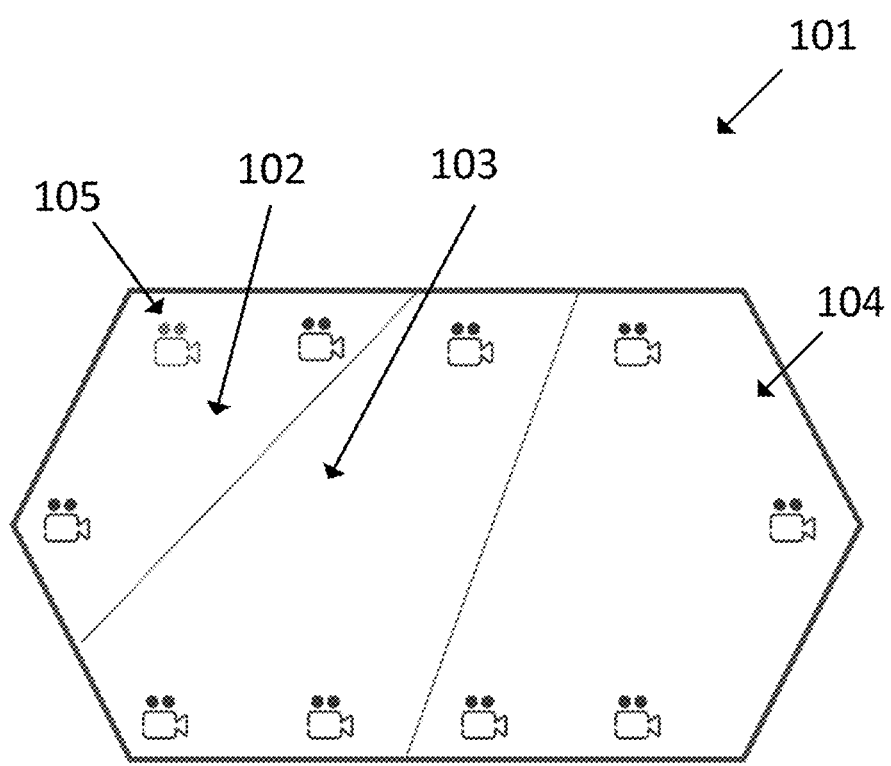
FIG. 3 schematically illustrates the concept of the present disclosure.

FIG. 3 schematically illustrates the concept of the present disclosure. Here, we consider the case where each camera is transmitting a single video feed at a time to reduce the bitrate requirements on the wireless network. One issue to solve is how quickly to switch between a LQ video content and a HQ video content stream, when a different camera feed goes on air, i.e. goes live. Typical encoders should be able to switch within one frame. Also, cameras with two encoders are available so a camera can generate both LQ content video and HQ content video feeds at the same time. The presented solution, therefore, addresses the wireless transmission link, i.e., the round-trip-time including instruction from the stream controller to switch from LQ content video to HQ content video until a HQ content video feed is received at the production studio.

The proposed method aims at predicting that a switch to a different camera will happen. In a typical event where, multiple cameras are deployed, e.g. stadium, ski, formula 1, the cameras are distributed across the event field. FIG. 3 depicts 101 a sketch of an event with ten cameras, where one camera 105 is currently on air, i.e. live. The other cameras can be divided into different regions with different likelihood that a switch to the other cameras will happen, i.e. as indicated with reference numerals 102, 103 and 104.

The production studio may use several information about the cameras, to construct the switching likelihood. Such information includes static information about the event, e.g. number of cameras, geometry, camera capabilities, available encoding bitrates, and dynamic information about the event, e.g. camera location. This information may be exchanged between the cameras and the production studio, in such a way that in 1) static information may be exchanged between the cameras and the production studio, 2) uplink video streaming between the cameras and production studio may take place, 3) capabilities and location information update may take place, and 4) instructions to switch between different qualities may be given by the production studio to the cameras.

In order to decide on the switching between different qualities for the camera feeds, the production studio creates a mapping which associates the different qualities with the likelihood that a switch will occur. Other mappings can apply and the number of likelihoods and qualities can be determined based on the exchanged camera capabilities and geometry of the event. The switching likelihoods may be updated dynamically based on the updated location information and other event-related parameters The likelihood can be determined as a function of the distance. Let $P_0=(x_0, y_0, Z_0)$ be the current position of on-air camera, $P_i=(x_i, y_i, Z_i)$ the current position of each other camera i, i=1 . . . N and $d_i(P_i, P_0)$ be the distance between the cameras and on-air camera. The likelihood can be expressed as inversely proportional to the distance: $L_i \propto$ $$\frac{1}{d_j} \quad (1)$$

In FIG. 3, different regions are indicated as shown with reference numerals 102, 103 and 104. Following the above given guidelines, it might be determined that the camera's present in the region having reference numeral 102 are likely to be the next live camera. As such, these camera's are request to already start providing the HQ content video stream. It is less likely that the cameras located in the region with reference numeral 103 are considered to be the next live camera. As such, the cameras located in this region 103 may be requested to start providing a Medium Quality, MQ, content video stream. Finally, it is unlikely that the cameras located in the region having reference numeral 104 are considered to be the next live camera, such that it may be acceptable that these cameras provide only a LQ video content stream.

Figure 4:
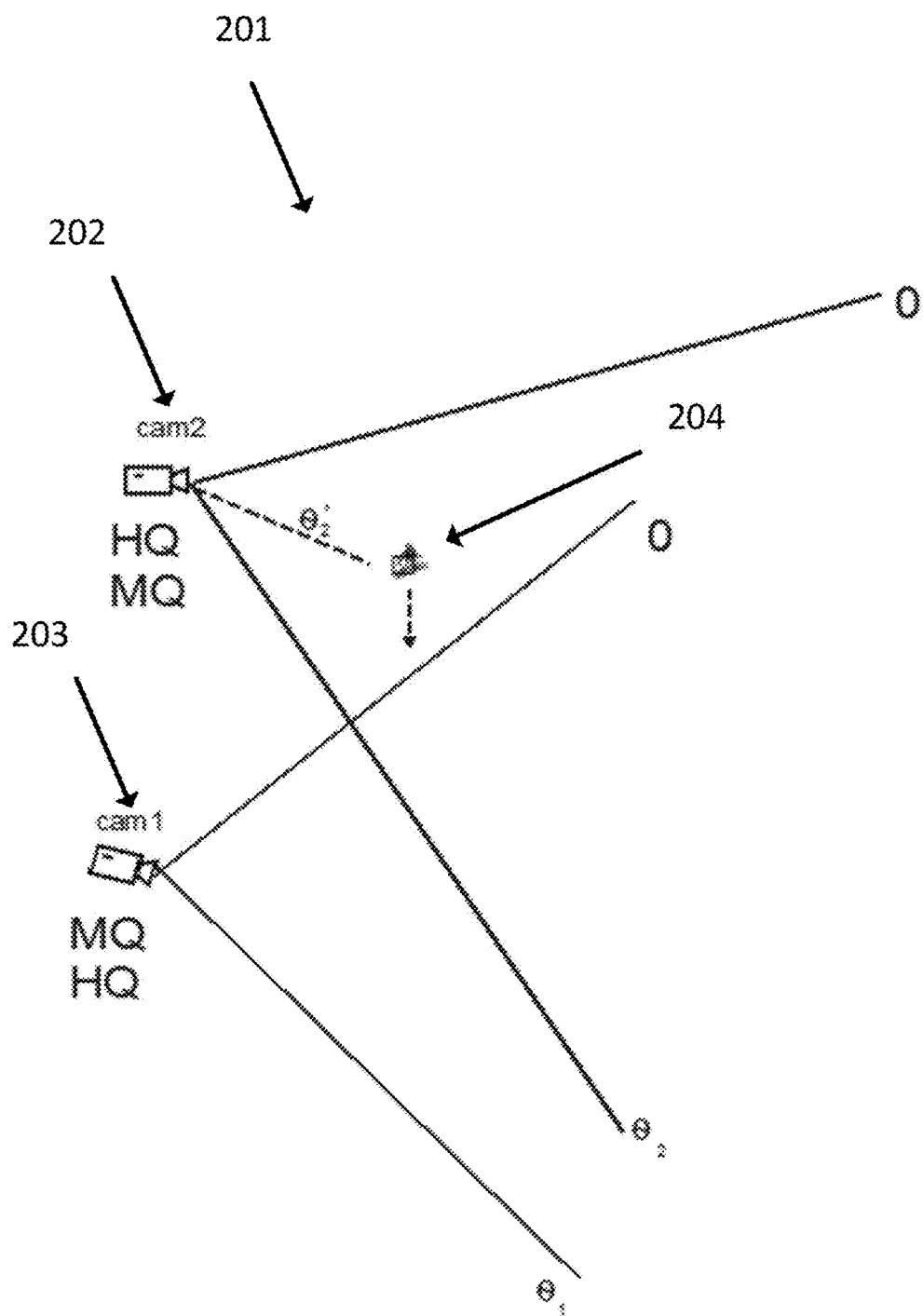
FIGS. 4 and 5 schematically illustrate an example in which the field of view is used as an input parameter for determining the likelihood that a camera is to be the next live camera.
Figure 5:
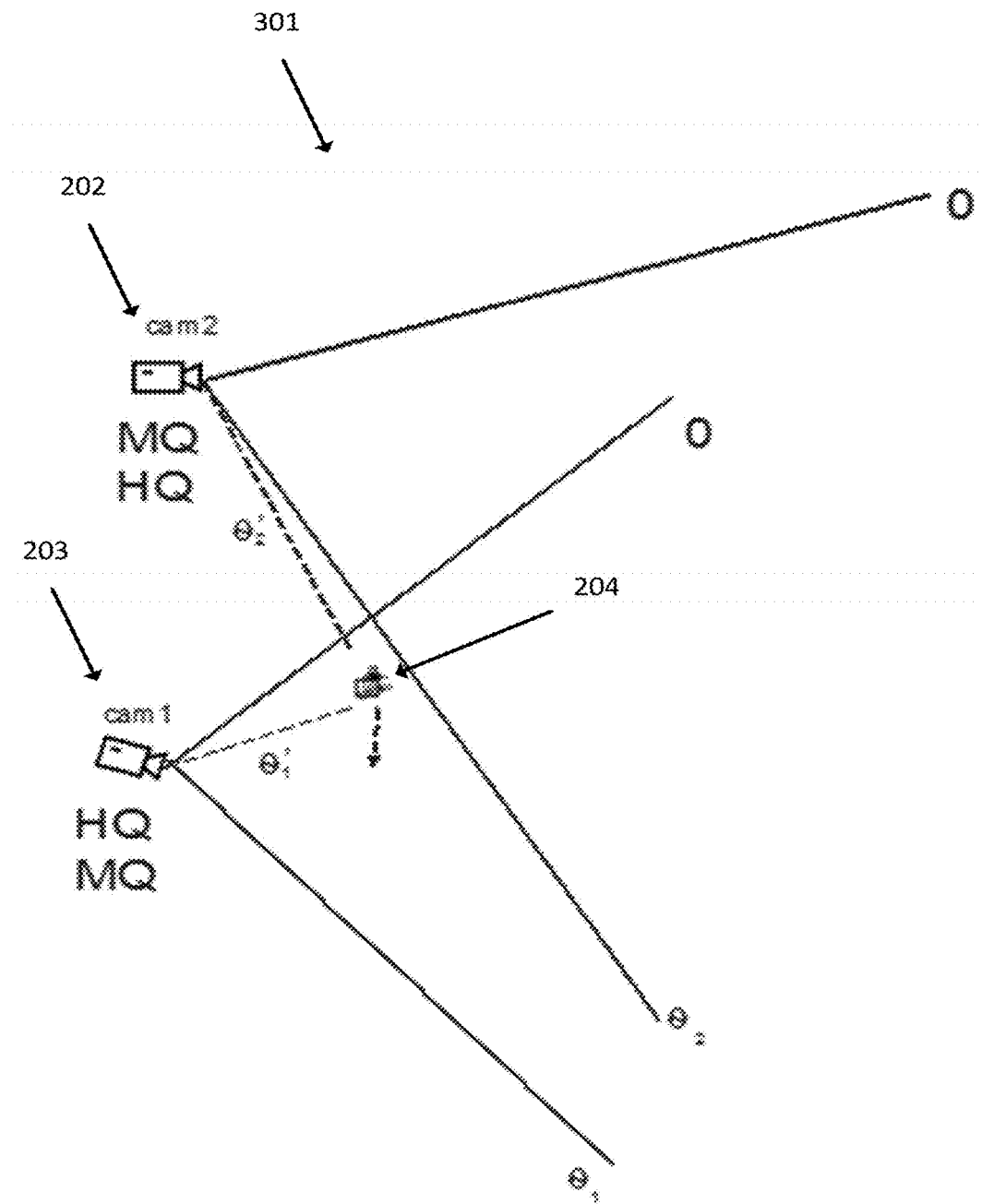

FIGS. 4 and 5 schematically illustrate an example 201, 301 in which the field of view is used as an input parameter for determining the likelihood that a camera is to be the next live camera.

Another aspect that can be added, or used in stead of the distance aspect, to the prediction of switching from one camera to the other is the rate of change in angle of view of each camera. Here we assume that each camera has a preferred angle of view $\theta_i$ as shown in FIG. 4 and FIG. 5, where cam2 202 is covering the objects within angle $\theta_2$, and cam1 203 is covering the objects in the area within $\theta_1$.

The target 204 is moving from 0 towards $\theta_2$, and therefore it falls in the area of coverage for cam2 202. Therefore, cam2 202 is streaming high quality, HQ, stream to the studio, while it is generating media quality, MQ, video but not transmitting it. The camera movement, following the target 204, is recorded via an accelerometer embedded in the camera, this data can be translated as value of $\theta_2$. The accelerometer data is sent periodically to the studio, the studio can compare this value to understand the movement of the target.

Once the target 204 has reached a certain threshold of $\theta_2$ where $\theta'_2<\theta_2$, the studio understands that the target is about to leave cam2 202 and enter cam1 203 area. Cam1 203 starts preparing the HQ stream and expects to be on air soon. It's further possible that the network gets notified about this possible changes and prepare the necessary resources for cam1 203. When the threshold increases where $\theta'_2>\theta_2$, cam1 203 may start sending the HQ stream over the telecommunication network, for example including the radio and the core network, to the production site, while cam2 202 switches from HQ to MQ content video.

Figure 6:
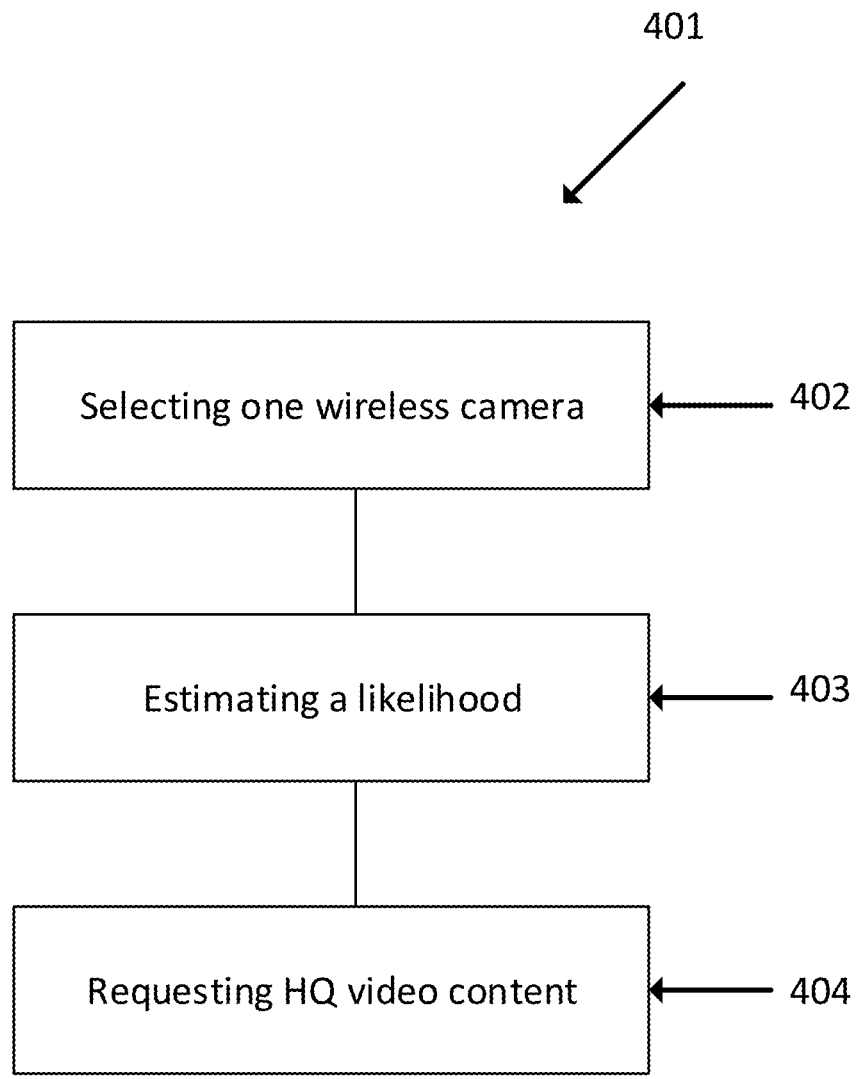
FIG. 6 schematically illustrates a flow chart of a method in accordance with the present disclosure.

FIG. 6 schematically illustrates a flow chart 401 of a method in accordance with the present disclosure.

A method of providing video content to a production studio by selecting an input video stream from a plurality of wireless video cameras over a wireless telecommunication network, wherein each of said wireless video cameras is arranged for providing at least a High Quality, HQ, and a Low Quality, LQ, video output, said method comprising the steps of: selecting 402, by a stream controller, one among said plurality of wireless cameras as a live camera thereby instructing said selected live camera to provide HQ video output such that video content provided to said production studio is said HQ video output from said selected live camera; estimating 403, by said stream controller, a likelihood of a further one of said plurality of wireless cameras to be a next live camera, following said selected live camera; requesting 404, by said stream controller, said further one of said plurality of wireless cameras to provide HQ video output based on said estimation such that HQ video output is made available in case said stream controller decides to switch to said further one of said plurality of wireless cameras The skilled person understands, that the wireless camera may comprise other components, the most obvious being video capture equipment. This is neither illustrated nor further described in the figures as it is considered to be well known. The camera comprises a transmitter arranged for transmitting wirelessly the captured video towards the stream controller.

Other variations to the disclosed examples can be understood and effected by those skilled in the art in practicing the claimed disclosures, from a study of the drawings, the disclosure and the appended claims. In the claims, the word "comprising" does not exclude other elements or steps, and the indefinite article "a" or "an" does not exclude a plurality.

A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the internet or wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of providing live video content using a plurality of wireless video cameras comprising a first wireless video camera and a second wireless video camera, wherein each of the wireless video cameras of the plurality of wireless video cameras is arranged for providing at least a video output having a first quality and a video output having a second quality that is lower than the first quality, and the first wireless video camera of the plurality of wireless video cameras currently provides video output having the first quality for the live video content, the method comprising:
   estimating a likelihood that the second wireless video camera will be selected to provide the live video content;
   based on the estimated likelihood, requesting the second wireless video camera to provide video output having the first quality; and
   after requesting the second wireless video to provide video output having the first-quality, quality:
   i) determining a location of a target; and
   ii) based on the determined location of the target and after requesting the second wireless video camera to provide video output having the first quality, determining whether or not to switch the live video content from the first wireless video camera to the second wireless video camera so that the second wireless video camera provides video output having the first quality for the live video content.

2. The method of claim 1, wherein
   requesting the second wireless video camera to provide video output having the first quality based on the estimated likelihood comprises:
   determining that the estimated likelihood exceeds a threshold; and
   requesting the second wireless video camera to provide video output having the first quality as a result of determining that the estimated likelihood exceeds the threshold.

3. The method of claim 2, wherein
   the plurality of wireless video cameras further comprises a third wireless video camera, and
   the method further comprises:
   estimating a likelihood that the third wireless video camera will be selected to provide the live video content;
   determining that the estimated likelihood that the third wireless video camera will be selected to provide the live video content is lower than the threshold; and
   requesting the third wireless video camera to provide video output having the second quality as a result of determining that the estimated likelihood that the third wireless video camera will be selected to provide the live video content is lower than the threshold.

4. The method of claim 1, wherein estimating the likelihood that the second wireless video camera will be selected to provide the live video content comprises:
   determining a distance between the second wireless video camera and the first wireless video camera; and
   estimating the likelihood based on the determined distance.

5. The method of claim 4, wherein the estimated likelihood is inversely proportional to the determined distance.

6. The method of claim 4, wherein
   the first wireless video camera is equipped with a first global positioning system (GPS) device,
   the second wireless video camera is equipped with a second GPS device, and
   determining the distance between the second wireless video camera and the first wireless video camera comprises obtaining first location information based on the first GPS device and second location information based on the second GPS device and determining the distance using the first location information and the second location information.

7. The method of claim 1, wherein estimating the likelihood that the second wireless video camera will be selected to provide the live video content comprises:
   determining a rate of change in an angle of view of the first wireless video camera; and
   estimating the likelihood based on the determined rate of change in the angle of view.

8. The method of claim 1, wherein the estimated likelihood is proportional to predicted overlap between an angle of view of the first wireless video camera and an angle of view of the second wireless video camera.

9. The method of claim 1, wherein
   the first wireless video camera is further arranged for providing a video output having a third quality that is higher than the second quality and lower than the third quality, and
   the second wireless video camera is further arranged for providing a video output having the third quality.

10. A computer program product comprising a non-transitory computer readable medium having instructions stored thereon which, when executed by a stream controller, cause the stream controller to perform the method of claim 1.

11. A stream controller arranged for providing live video content using a plurality of wireless video cameras comprising a first wireless video camera and a second wireless video camera, wherein each of the wireless video cameras of the plurality of wireless video cameras is arranged for providing at least a video output having a first quality and a video output having a second quality that is lower than the first quality, the stream controller comprising:
   memory; and
   processing circuitry coupled to the memory, wherein the stream controller is configured to perform a method comprising:
   estimating a likelihood that the second wireless video camera will be selected to provide the live video content;
   based on the estimated likelihood, requesting the second wireless video camera to provide video output having the first quality; and
   after requesting the second wireless video to provide video output having the first quality:
   i) determining a location of a target; and 2) Based on the determined location of the target and after requesting the second wireless video camera to provide video output having the first quality, switching determining whether or not to switch the live video content from the first wireless video camera to the second wireless video camera so that the second wireless video camera provides video output having the first quality for the live video content.

12. The stream controller of claim 11, wherein
requesting the second wireless video camera to provide video output having the first quality based on the estimated likelihood comprises:
determining that the estimated likelihood exceeds a threshold; and
requesting the second wireless video camera to provide video output having the first quality as a result of determining that the estimated likelihood exceeds the threshold.

13. The stream controller of claim 12, wherein
the plurality of wireless video cameras further comprises a third wireless video camera, and
the method further comprises:
estimating a likelihood that the third wireless video camera will be selected to provide the live video content;
determining that the estimated likelihood that the third wireless video camera will be selected to provide the live video content is lower than the threshold; and
requesting the third wireless video camera to provide video output having the second quality as a result of determining that the estimated likelihood that the third wireless video camera will be selected to provide the live video content is lower than the threshold.

14. The stream controller of claim 11, wherein estimating the likelihood that the second wireless video camera will be selected to provide the live video content comprises:
determining a distance between the second wireless video camera and the first wireless video camera; and
estimating the likelihood based on the determined distance.

15. The stream controller of claim 14, wherein the estimated likelihood is inversely proportional to the determined distance.

16. The stream controller of claim 14, wherein
the first wireless video camera is equipped with a first global positioning system (GPS) device,
the second wireless video camera is equipped with a second GPS device, and
determining the distance between the second wireless video camera and the first wireless video camera comprises obtaining first location information based on the first GPS device and second location information based on the second GPS device and determining the distance using the first location information and the second location information.

17. The stream controller of claim 11, wherein estimating the likelihood that the second wireless video camera will be selected to provide the live video content comprises:
determining a rate of change in an angle of view of the first wireless video camera; and
estimating the likelihood based on the determined rate of change in the angle of view.

18. The stream controller of claim 11, wherein the estimated likelihood is proportional to predicted overlap between an angle of view of the first wireless video camera and an angle of view of the second wireless video camera.

19. The stream controller of claim 11, wherein
the first wireless video camera is further arranged for providing a video output having a third quality that is higher than the second quality and lower than the third quality, and
the second wireless video camera is further arranged for providing a video output having the third quality.

* * * * *